United States Patent
Rom et al.

(10) Patent No.: US 11,007,427 B2
(45) Date of Patent: *May 18, 2021

(54) METHOD AND APPARATUS FOR MONITORING AND CALIBRATING PERFORMANCES OF GAMERS

(71) Applicant: STEELSERIES ApS, Frederiksberg (DK)

(72) Inventors: Kim Rom, San Francisco, CA (US); Francis Arnold Grever, Palatine, IL (US); Jeffrey Nicholas Mahlmeister, Glenview, IL (US); Jacob Wolff-Petersen, Richmond (GB); Bruce Hawver, Hawthorn Woods, IL (US); Tino Soelberg, Chicago, IL (US); Christopher John Nicolella, Elk Grove Village, IL (US)

(73) Assignee: STEELSERIES ApS, Frederiksberg (DK)

( * ) Notice: Subject to any disclaimer, the term of this patent is extended or adjusted under 35 U.S.C. 154(b) by 76 days.

This patent is subject to a terminal disclaimer.

(21) Appl. No.: 16/545,485

(22) Filed: Aug. 20, 2019

(65) Prior Publication Data

US 2019/0366202 A1    Dec. 5, 2019

Related U.S. Application Data

(63) Continuation of application No. 15/846,927, filed on Dec. 19, 2017, now Pat. No. 10,413,813, which is a
(Continued)

(51) Int. Cl.
*A63F 13/00* (2014.01)
*A63F 9/24* (2006.01)
(Continued)

(52) U.S. Cl.
CPC .......... *A63F 13/212* (2014.09); *A63F 13/211* (2014.09); *A63F 13/213* (2014.09);
(Continued)

(58) Field of Classification Search
CPC ........ A63F 13/20; A63F 13/21; A63F 13/211; A63F 13/212; A63F 13/213;
(Continued)

(56) References Cited

U.S. PATENT DOCUMENTS

| 4,925,189 A | 5/1990 | Braeunig |
| 5,697,791 A | 12/1997 | Nashner et al. |

(Continued)

*Primary Examiner* — Milap Shah
(74) *Attorney, Agent, or Firm* — Guntin & Gust, PLC; Jay Anderson (57) ABSTRACT

A gaming system employs bioinformatics to improve gamer performance and enhance the gaming experience. The gaming system monitors biometrics of gamers using gaming accessories having sensors coupled to the gaming accessories (e.g., a mouse with pulse sensor). Biometrics can be used to assess a crisis or panic reaction of the gamer. The system can also assess the state of the game in real time via API feedback, and coach the player on how best to regain control. The system can also predict a gamer's loss of control by monitoring hardware statistics associated with the game, combined with gaming feedback and biometric data, and can determine how best to coach the player to correct problems. Predictive models can be used to predict a gamer's panic attack or loss of control before it occurs. When a crisis occurs, the system can automatically contact the gamer's teammates to assist the gamer.

20 Claims, 9 Drawing Sheets

Related U.S. Application Data continuation of application No. 15/278,249, filed on Sep. 28, 2016, now Pat. No. 9,889,374, which is a continuation of application No. 13/780,571, filed on Feb. 28, 2013, now Pat. No. 9,480,911.

(51) Int. Cl.

| | | |
|---|---|---|
| *A63F 13/212* | (2014.01) | |
| *A63F 13/213* | (2014.01) | |
| *A63F 13/798* | (2014.01) | |
| *A63F 13/215* | (2014.01) | |
| *A63F 13/211* | (2014.01) | |
| *A63F 13/327* | (2014.01) | |
| *A63F 13/335* | (2014.01) | |
| *A63F 13/79* | (2014.01) | |

(52) U.S. Cl.
CPC .......... *A63F 13/215* (2014.09); *A63F 13/327* (2014.09); *A63F 13/335* (2014.09); *A63F 13/79* (2014.09); *A63F 13/798* (2014.09); *A63F 2300/1087* (2013.01); *A63F 2300/405* (2013.01); *A63F 2300/407* (2013.01)

(58) Field of Classification Search
CPC ........ A63F 13/217; A63F 13/22; A63F 13/23; A63F 13/235; A63F 13/798; A63F 2300/10; A63F 2300/1012; A63F 2300/1018; A63F 2300/1025; A63F 2300/1037; A63F 2300/1043; A63F 2300/105; A63F 2300/1062; A63F 2300/1087; G09B 19/0038
See application file for complete search history.

(56) References Cited

U.S. PATENT DOCUMENTS

| | | | |
|---|---|---|---|
| 6,132,337 | A | 10/2000 | Krupka et al. |
| 6,308,565 | B1 | 10/2001 | French et al. |
| 6,450,820 | B1 | 9/2002 | Palsson et al. |
| 6,503,086 | B1 | 1/2003 | Golubov et al. |
| 9,480,911 | B2 | 11/2016 | Rom et al. |
| 9,889,374 | B2 | 2/2018 | Rom et al. |
| 10,413,813 | B2 * | 9/2019 | Rom .................... A63F 13/327 |
| 2002/0072932 | A1 | 6/2002 | Swamy et al. |
| 2004/0077934 | A1 | 4/2004 | Massad et al. |
| 2005/0181347 | A1 | 8/2005 | Barnes et al. |
| 2006/0141431 | A1 | 6/2006 | Lee et al. |
| 2006/0271407 | A1 | 11/2006 | Rosenfeld et al. |
| 2006/0281543 | A1 | 12/2006 | Sutton et al. |
| 2007/0066403 | A1 | 3/2007 | Conkwright et al. |
| 2008/0146334 | A1 | 6/2008 | Kil |
| 2008/0261186 | A1 | 10/2008 | Hurling |
| 2008/0318673 | A1 | 12/2008 | Rofougaran et al. |
| 2009/0270170 | A1 | 10/2009 | Patton |
| 2009/0281400 | A1 | 11/2009 | McCraty et al. |
| 2010/0331146 | A1 | 12/2010 | Kil et al. |
| 2011/0098112 | A1 | 4/2011 | LeBoeuf et al. |
| 2011/0260830 | A1 | 10/2011 | Weising |
| 2013/0034837 | A1 | 2/2013 | Clapp et al. |
| 2013/0137552 | A1 | 5/2013 | Kemp et al. |
| 2013/0203475 | A1 | 8/2013 | Kil et al. |
| 2017/0014710 | A1 | 1/2017 | Rom |
| 2018/0117457 | A1 | 5/2018 | Rom et al. |

* cited by examiner

METHOD AND APPARATUS FOR MONITORING AND CALIBRATING PERFORMANCES OF GAMERS

CROSS-REFERENCE TO RELATED APPLICATIONS

This application is a continuation of U.S. patent application Ser. No. 15/846,927, filed Dec. 19, 2017, now U.S. Pat. No. 10,413,813, which is a continuation of U.S. patent application Ser. No. 15/278,249, filed Sep. 28, 2016, now U.S. Pat. No. 9,889,374, which is a continuation of U.S. patent application Ser. No. 13/780,571, filed Feb. 28, 2013, now U.S. Pat. No. 9,480,911. The contents of each of the foregoing are hereby incorporated by reference into this application as if set forth herein in full.

FIELD OF THE DISCLOSURE

The present disclosure relates generally to a method and apparatus for monitoring and calibrating performances of gamers.

BACKGROUND

As on-line games become more sophisticated, it is increasingly common for a game to be a highly absorbing experience for the gamer. This is especially true of gamers who play competitive games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories. All of these accessories provide stimuli to the gamer.

A gamer can frequently use a combination of these accessories in one game (e.g., headset, a keyboard, and mouse). Efficient management and utilization of these accessories can frequently impact a gamer's ability to compete. Furthermore, the absorbing nature of the game can cause physiological responses in the gamer which in turn affect the gamer's performance.

Accessory management, including monitoring a user's responses to stimuli from various accessories, can have utility in other disciplines which may not relate to gaming applications and can be important to other users.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for collecting, processing, archiving and presenting bioinformatics data regarding performances of gamers, and for coaching gamers to better control their responses to game stimuli to improve performance Other embodiments are contemplated by the subject disclosure.

One embodiment of the present disclosure can entail a method for monitoring biometric data of a game user by a gaming system, including receiving biometric data of a game user via a biometric sensor, establishing criteria for the biometric data with respect to game performance, subsequently determining, based on the criteria, whether the biometric data indicates an occurrence of a game performance event requiring a corrective action, and performing the corrective action in accordance with determination of the occurrence of the game performance event. The criteria can also include game performance criteria relating to the user. The method can further include receiving game performance data of the game user, and subsequently determining, based on the criteria, whether the game performance data indicates occurrence of the game performance event.

The biometric sensor can be integrated with a game accessory. The biometric data can include one or more of pulse rate, temperature, perspiration, eye movement, speech pattern, or facial expression of the user. The game performance data can include one or more of click rate, firing rate, firing accuracy or movement accuracy of the user. The corrective action can include providing a visual coaching message and/or an audio coaching message to the user.

The method can also include establishing a profile for the game user based on the criteria, providing access to the profile via a network, establishing a gamer profile for a specific game, analyzing profiles of gamers accessed via the network, identifying a candidate gamer in accordance with comparing a profile of the candidate gamer with the gamer profile, and sending a message to the candidate gamer.

The method can also include updating an event log with the occurrence of the game performance event, establishing a profile for the game user based on the criteria, establishing a predictive model for the occurrence of the game performance event in accordance with the profile, the event log, and characteristics of the game, and applying the predictive model to the biometric data to predict a future game performance event.

One embodiment of the present disclosure can entail a gaming device including a memory to store instructions and a processor coupled to the memory. The processor, responsive to executing the instructions, can perform operations including receiving biometric data of a game user via a biometric sensor, establishing criteria for the biometric data with respect to game performance, subsequently determining, based on the criteria, whether the biometric data indicates an occurrence of a game performance event requiring a corrective action, and performing the corrective action in accordance with determination of the occurrence of the game performance event.

One embodiment of the present disclosure can entail a tangible computer-readable storage device, including computer instructions which, when executed by a processor, cause the processor to perform operations including receiving biometric data of a game user via a biometric sensor, establishing criteria for the biometric data with respect to game performance, subsequently determining, based on the criteria, whether the biometric data indicates an occurrence of a game performance event requiring a corrective action, and performing the corrective action in accordance with determination of the occurrence of the game performance event.

Figure 1:
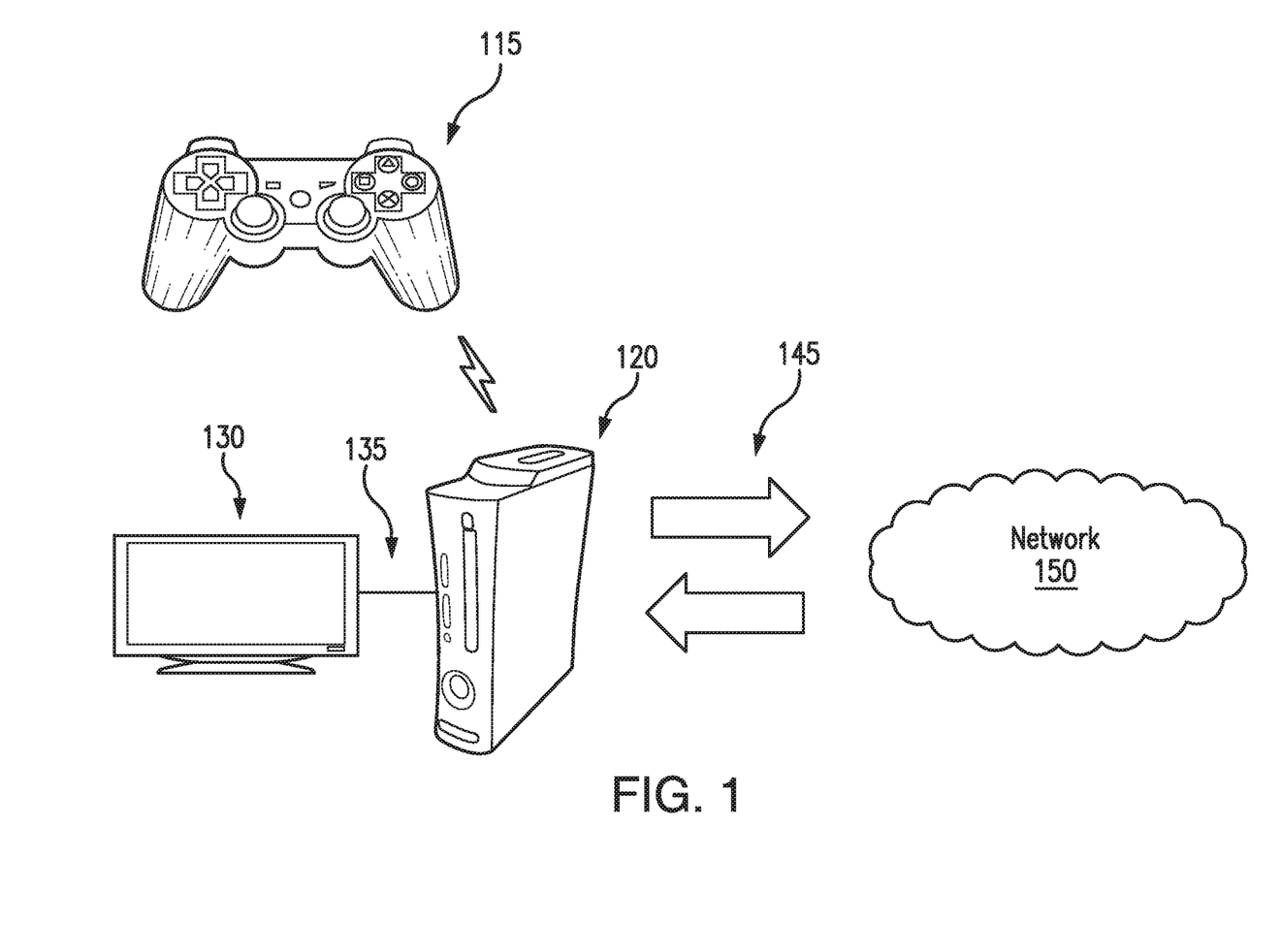
FIGS. 1 and 2 depict illustrative embodiments for communicatively coupling a gaming controller to a computing device via a network FIG. 3 schematically illustrates gaming accessories that can be used by a gamer and provide stimuli to the gamer.

FIG. 1 schematically depicts a gaming controller 115 which can be used by a gamer, according to an embodiment of the disclosure. In this embodiment, gaming controller 115 and gaming console 120 have an integrated wireless interface for wireless communications therebetween (e.g., WiFi, Bluetooth, ZigBee, or proprietary protocol). The gaming console 120 is coupled to network 150 via communication link 145, such as a WiFi link, to the Internet. The gaming console 120 can be, for example, an Xbox™, a PS3™, a Wii™, or another suitable gaming console device. Video information is displayed to the gamer on display device 130, which in this illustration is coupled to gaming console 120 by a wired connection 135. Display device 130 may be a television or a touch screen so that it comprises both an input device and an output device for the online game. Alternatively, the gaming controller 115 can be tethered to a computing device such as the gaming console by a cable (e.g., USB cable) to provide a means of communication less susceptible to electromagnetic interference or other sources of wireless interference.

It is to be understood that the devices shown in FIG. 1 are merely examples of a wide variety of computing devices or other components that may be used in a video game, including an online game. For instance, in FIG. 2 a desktop computer 162 can be used in place of the gaming console 120. The desktop computer 162 can be configured to execute a gaming client (e.g., a software application) acting in cooperation with an on-line gaming server 172 accessible by the desktop computer 162 via the network 150 (e.g., World of Warcraft™).

Figure 2:
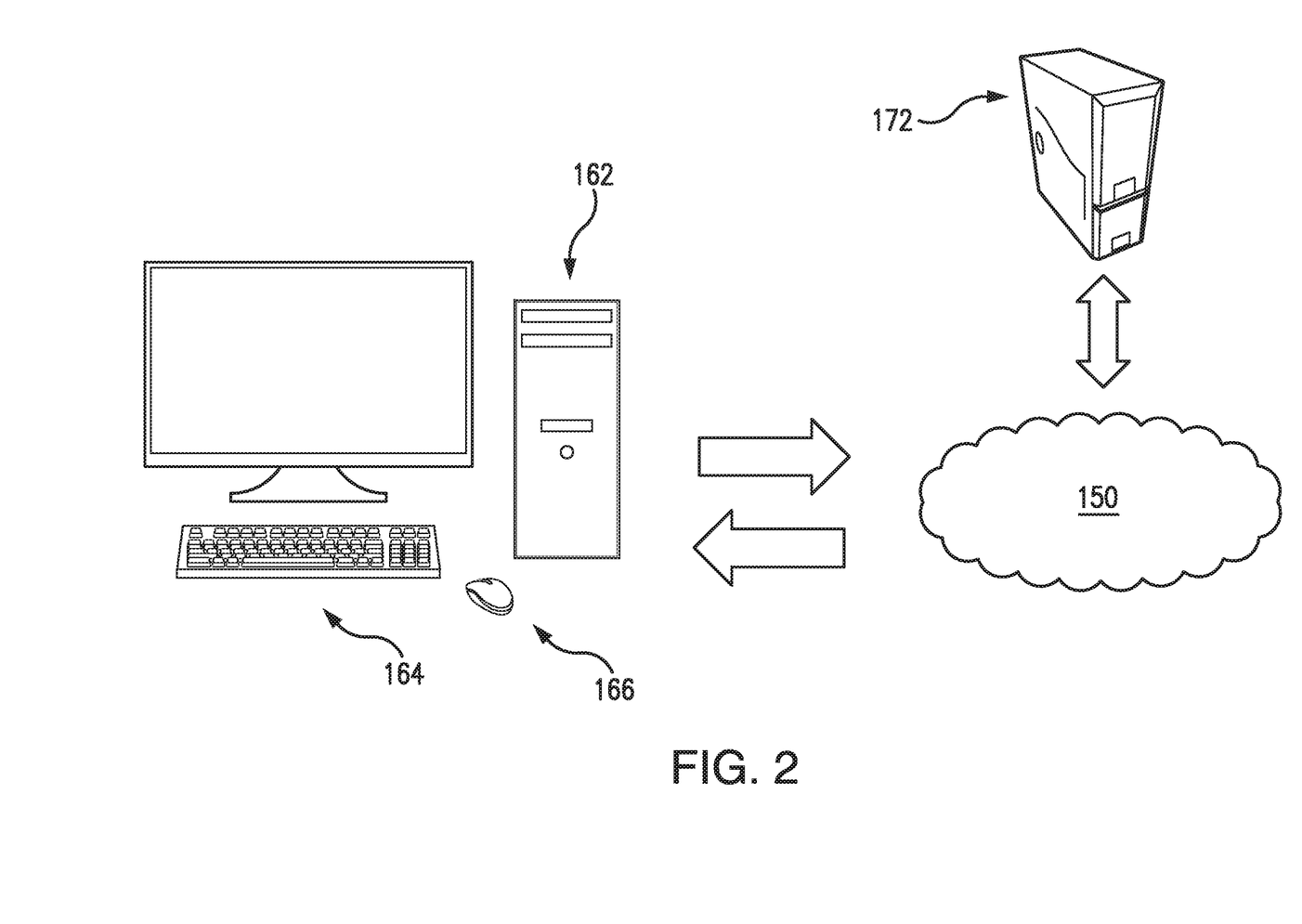

The gaming accessory used with the desktop computer 162 can be a keyboard 164, mouse 166, or another suitable gaming accessory device. In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a gaming controller, a mouse, a joystick, a microphone, or a headset with a microphone—just to mention a few.

In an embodiment, the gamer can interact with one or more of the gaming accessories via a Graphical User Interface (GUI) generated by an Accessory Management Software (AMS) application. The AMS application can be executed by a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, or a media player (such as an iPOD™). It is contemplated that the AMS application can be executed by any device with suitable computing resources.

The term "gaming system," as used herein, refers to the combination of computing hardware and software that delivers the gaming experience. The software applications that present and manage the gaming experience are collectively referred to herein as the "gaming engine." The gaming engine can include the Accessory Management Software for controlling the various accessories, and/or an Application Program Interface (API) for receiving feedback from the gamer.

A gaming system according to the present disclosure can employ bioinformatics to improve gamer performance and enhance the gaming experience. The gaming system can monitor one or more biometrics of one or more gamers (e.g., perspiration, eye movement, pulse rate, body temperature, speech patterns, etc.). These biometrics can be measured using gaming accessories performing image processing, or sensors coupled to gaming accessories (e.g., a mouse with pulse sensor and body temperature sensor). Biometrics measured by the system can be used to assess a crisis or panic reaction of the gamer. The system can also assess the state of the game in real time via API feedback from the game, and coach the player on how best to regain control. In an embodiment, the system can also predict a gamer's loss of control from a rate of misclicks, misfires, rapid loss of health, and/or erratic movements. In an embodiment, the system can continuously monitor hardware statistics associated with the game ("HW stats"), combined with gaming feedback and biometric data, to determine how best to coach the player to correct problems. In a further embodiment, predictive models can be used to predict a gamer's panic attack or loss of control before it happens. When a crisis occurs, the system can automatically contact the gamer's teammates to assist the gamer.

Figure 3:
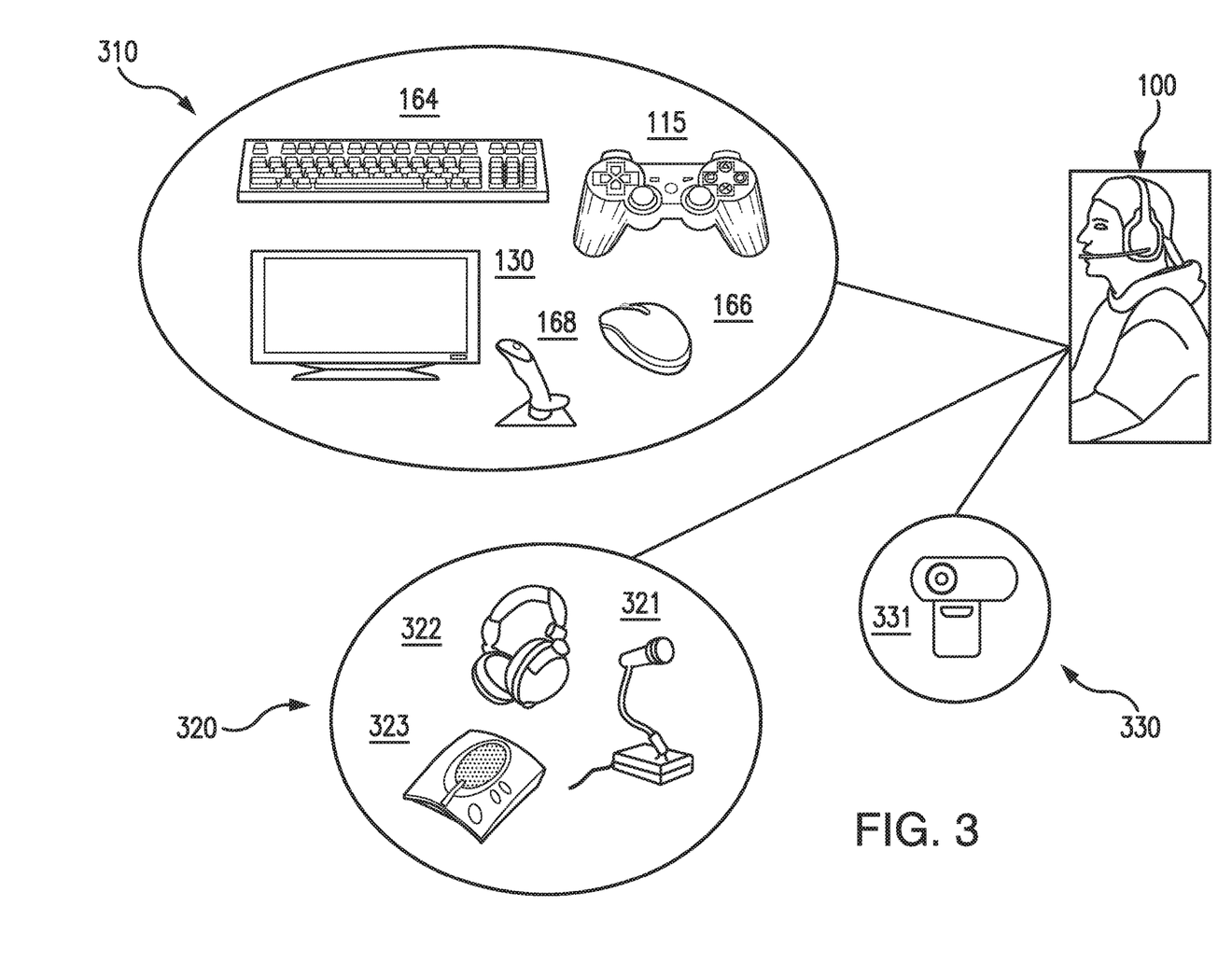

FIG. 3 illustrates gaming accessory devices with which a gamer 100 can interact. Touch-sensitive devices 310 can include a game controller 115, mouse 166, keyboard 164, touchscreen display 130, and joystick 168. Audio devices 320 can include headphones 322, microphone 321, and speakerphone 323. Imaging devices 330 can include webcam 331. These accessory devices can provide stimuli to the gamer, receive responses from the gamer, or both.

The accessories can be coupled to the computing device by a tethered interface (e.g., USB cable), a wireless interface (e.g., Bluetooth or Wireless Fidelity—WiFi), or combinations thereof.

Figure 4:
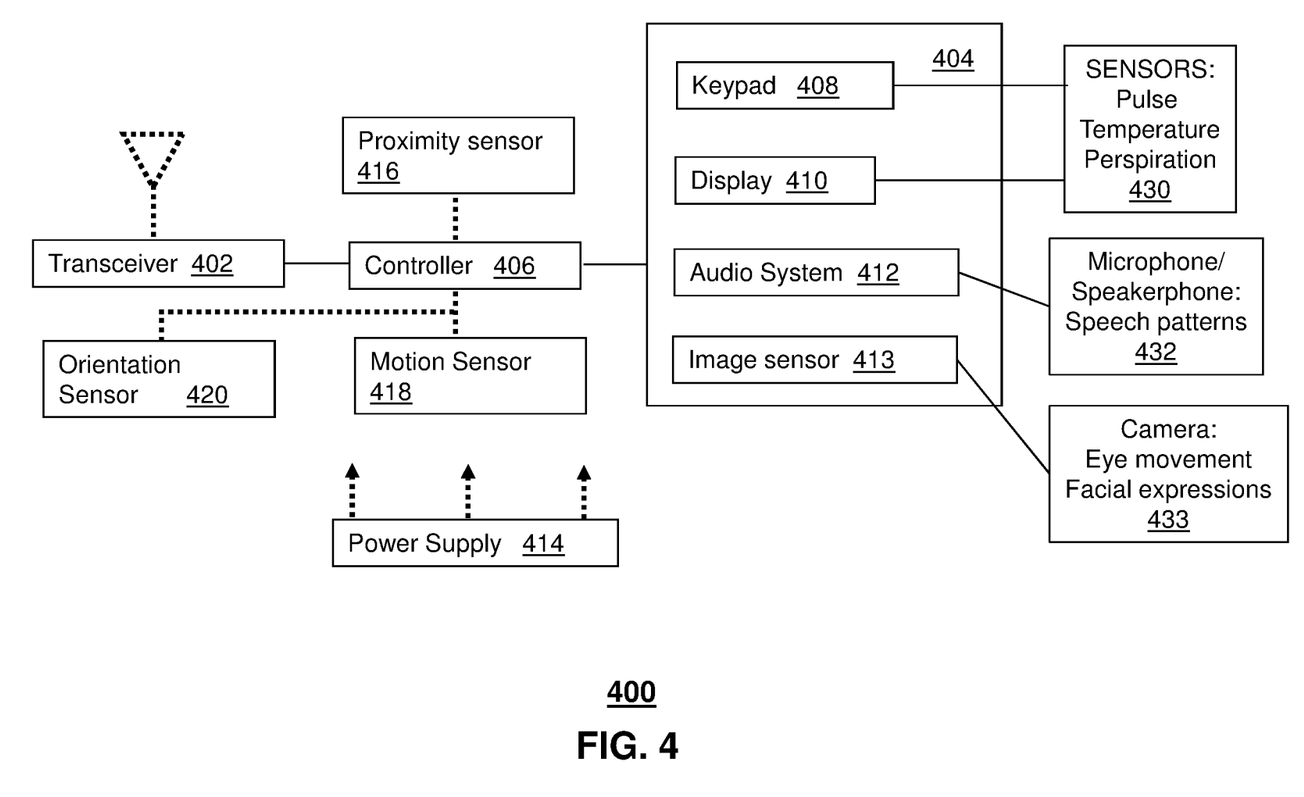
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1-3. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

In accordance with the present disclosure, the touch-sensitive keypad 408 or display 410 have sensors 430 for detecting the gamer's pulse, body temperature, or perspiration. More generally, sensors 430 can be included in any accessory that comes into physical contact with the gamer, and can comprise any sensing device for detecting a gamer's physiological response via the gamer's touch.

The UI 404 can also include an audio system 412 that utilizes common audio technology for conveying low volume audio (such as audio heard only in the proximity of a human ear) and high volume audio (such as a stereo or surround sound system). In accordance with the present disclosure, the audio system 412 can further include a device 432 such as a microphone or speakerphone, for receiving audible signals of the gamer. More generally, device 432 of audio system 412 can be any accessory that can transmit the gamer's voice and can be used in a system to detect the gamer's speech patterns. The UI 404 can further include an image sensor 413 for capturing still or moving images and performing image recognition therefrom. According to the present disclosure, the image sensor can include a device 433 such as a charged coupled device (CCD) camera. More generally, device 433 can be any accessory that can transmit the gamer's image and can be used in a system to capture the gamer's eye movements or facial expressions.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the present disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or fewer components described in FIG. 4 to accommodate the implementation of the devices described by the present disclosure. These variant embodiments are contemplated by the present disclosure.

Figure 5:
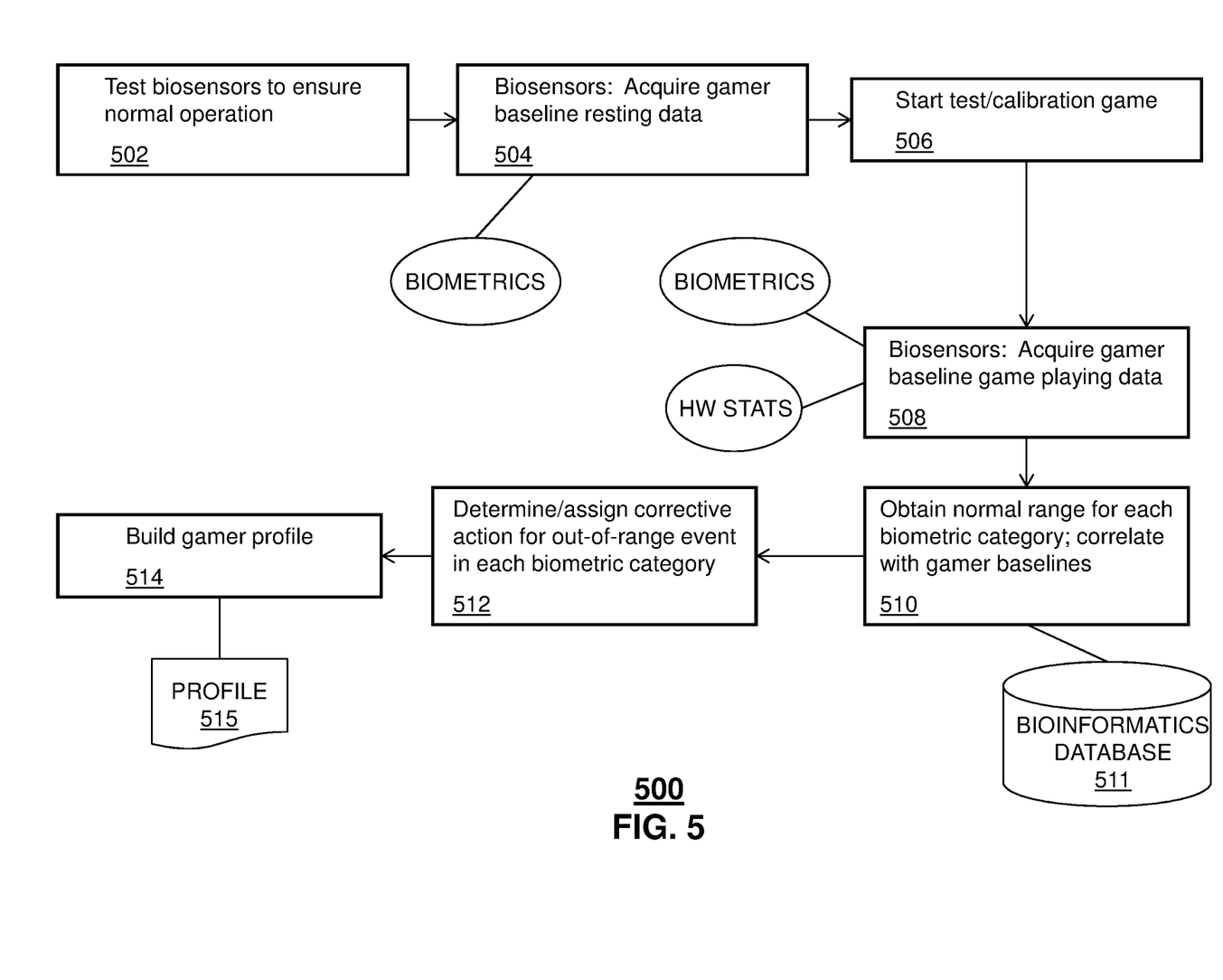
FIG. 5 is a flowchart showing steps in a method for calibrating a gamer's performance with biometric sensors and constructing a gamer's profile, in accordance with an embodiment of the disclosure.
Figure 6:
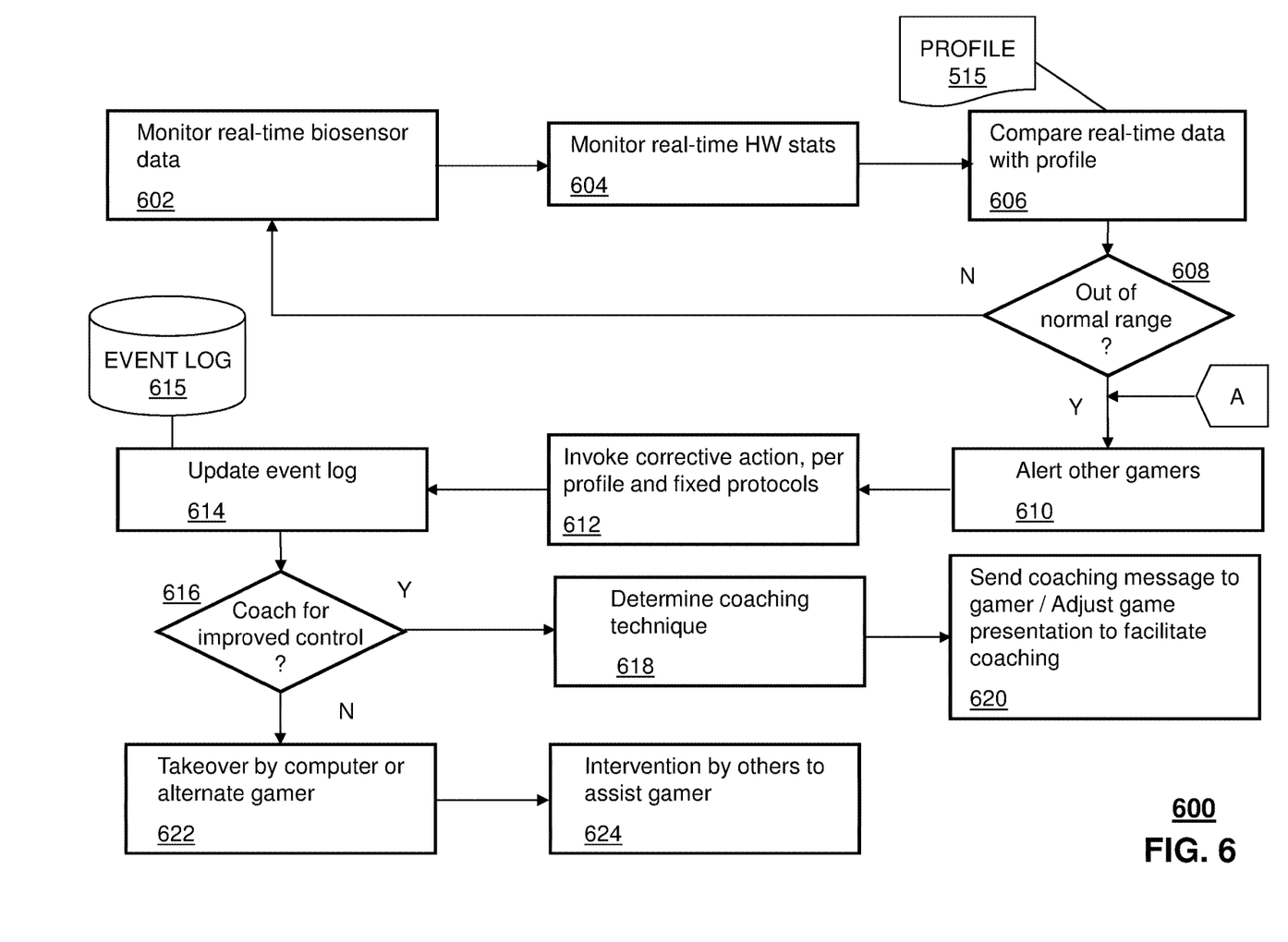
FIG. 6 is a flowchart showing steps in a method for monitoring a gamer by collecting biometric data and coaching a gamer, in accordance with an embodiment of the disclosure.
Figure 7:
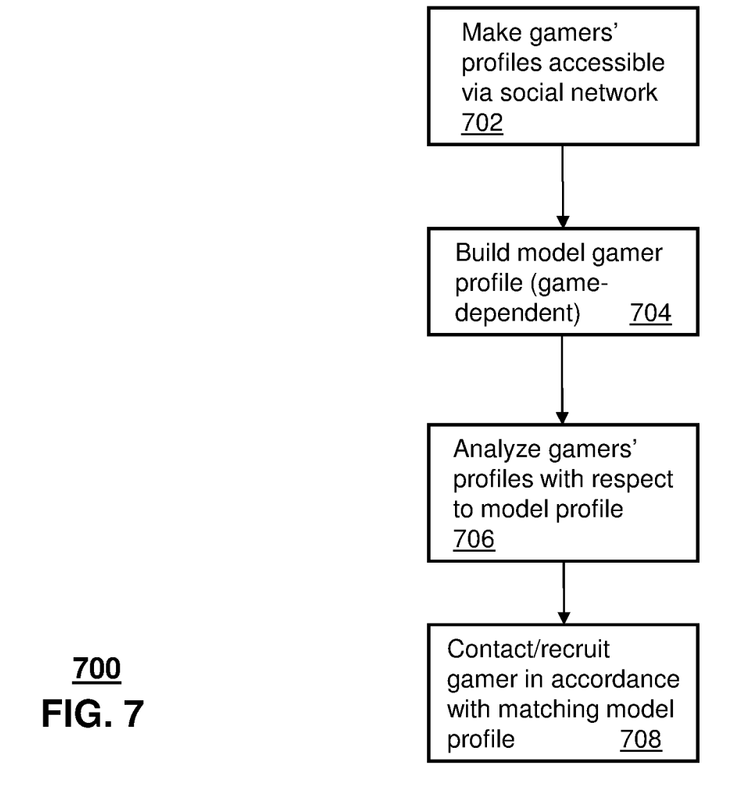
FIG. 7 is a flowchart showing steps in a method for sharing a gamer's biometric profile and facilitating connections among gamers on a social network, in accordance with an embodiment of the disclosure.

FIGS. 5-7 depict methods 500-700 describing illustrative embodiments of the present disclosure, in which biometric data for a gamer is collected to monitor the gamer's physiological responses while playing a game.

FIG. 5 is a flowchart showing steps in a method 500 for calibrating biosensors installed in (or otherwise in communication with) game accessory devices and used by a particular individual gamer. The various biosensors can be initialized and tested to ensure that they are operating normally (step 502). This can be done according to a device startup and self-test procedure embodied in software installed on the game accessory device or a computing device coupled to the game accessory. For example, to calibrate the gamer's responses, the gamer first follows a protocol (step 504) where biometric data (e.g., pulse rate, body temperature, speech pattern, etc.) is gathered while the gamer is in a 'resting' state, with no game being played. In steps 506 and 508, this protocol is repeated while the gamer plays a 'baseline' version of the game—for example, a standardized version of moderate difficulty where the gamer would be reasonably expected to perform without reaching a level of stress that would impair performance.

During step 508, the gaming engine also collects data indicating the gamer's proficiency when not under stress. The gamer's proficiency is generally determined by measuring statistics such as speed and precision of movement, rate of firing a weapon, accuracy with respect to firing at a target, speed of response (click rate) when presented with alternate courses of action, etc. These statistics are collectively referred to as hardware statistics or 'HW stats.'

For each category of biometric data, the gaming engine in step 510 retrieves information regarding a normal range from a database 511. The normal range from the database is compared with the data for the individual data collected in steps 504 and 508, and used to establish a normal range for the individual. For example, where the normal range of body temperature from the database is 97.6° F. to 99.6° F. but the individual's temperature when at rest is 97.4° F. and when playing the calibration game is 98.1° F., a temperature of 99.5° F. can be considered elevated. The normal body temperature range for that individual, in a gaming situation, might then be set at 97.4° F. to 99.0° F.

A corrective action is established for each biometric category (step 512) to be invoked when the real-time measurement for that category is found to be out of range. For example, if the gamer's measured pulse rate is elevated so that action is required, a visual message "Focus and take five deep breaths" may be prescribed. The prescribed corrective action can include notifying other gamers and/or transferring control of the game away from the gamer.

In step 514, the gaming engine constructs a profile 515 for the individual gamer that includes biometric categories, a normal range for each category, and corrective action for a measurement out of the normal range. The profile can advantageously also include a normal range of HW stats for the gamer, which typically will depend on the particular game being played as well as on the individual gamer's proficiency.

FIG. 6 is a flowchart showing steps in a method 600 for monitoring a gamer's performance and physiological responses in a real-time game environment, and initiating corrective action.

As the gamer interacts with various accessories provided with biosensors, the gaming engine collects biometric data (step 602). The gaming engine also collects HW stats indicating the gamer's real-time performance (step 604). The measured data is compared with the gamer's profile (step 606), either continuously or at prescribed intervals. In an embodiment, when a biometric measurement is out of the normal range with respect to the profile (step 608), other gamers are notified (step 610). The gaming engine then refers to the gamer's profile for the appropriate corrective action (step 612) and invokes that action. In an embodiment, a corrective action may also be prescribed by the gaming engine, in addition to the corrective action established in the gamer's profile.

In an embodiment, the gaming engine maintains a log of biometric events, which is updated (step 614) each time a measurement is out of range for a given biometric category. The event log 615 can also record HW stats that fall out of range with respect to the gamer's profile. This information is useful when evaluating a gamer's performance at particular phases of the game.

In step 616, the gaming engine determines whether coaching the gamer would be beneficial. If so, the gaming engine then determines the appropriate coaching technique (step 618). In general, the best coaching technique will depend on the individual gamer, the characteristics of the game, and the nature of the event. The gaming engine then provides advice or assistance to the gamer (step 620). For example, an audio or visual message can be presented to the gamer, in the form of a verbal/text message or simply a sound or light signal. The gaming engine can also change the presentation of the game to help the gamer in a situation where the gamer's physiological responses are out of normal range. For example, if the gamer's pulse rate is suddenly elevated, the gaming engine may slow down the rate at which new images are presented, in addition to flashing a message such as "Get back in control—take several deep breaths."

If in step 616 the gaming engine determines that coaching the gamer is not appropriate, the gaming engine can transfer control of the game to the gaming system or to another gamer (step 622). In a situation where the biometric data indicated that the gamer is in a crisis or having a panic reaction, the gaming engine can also signal another individual to personally assist the gamer (step 624).

In a further embodiment, a gamer's bioinformatics profile may be shared on a social network. FIG. 7 is a flowchart showing steps in a method 700 for using a social network, to facilitate interaction and team-building among gamers.

In step 702, profiles of gamers are made accessible via a social network. Accordingly, gamers can assess the skill of other gamers, and their aptitude for certain types of games. Based upon his profile, a gamer may be particularly suited for a given game. In step 704, the gaming system analyzes the characteristics of a game and constructs a 'model' profile of a gamer with high proficiency at that game. Gamers' actual profiles, obtained via the social network, are then compared with this model profile (step 706). An individual gamer expected to have a talent for a particular game can thus be identified. A team interested in that game can then contact that individual (step 708) to involve that gamer in their activities.

Figure 8:
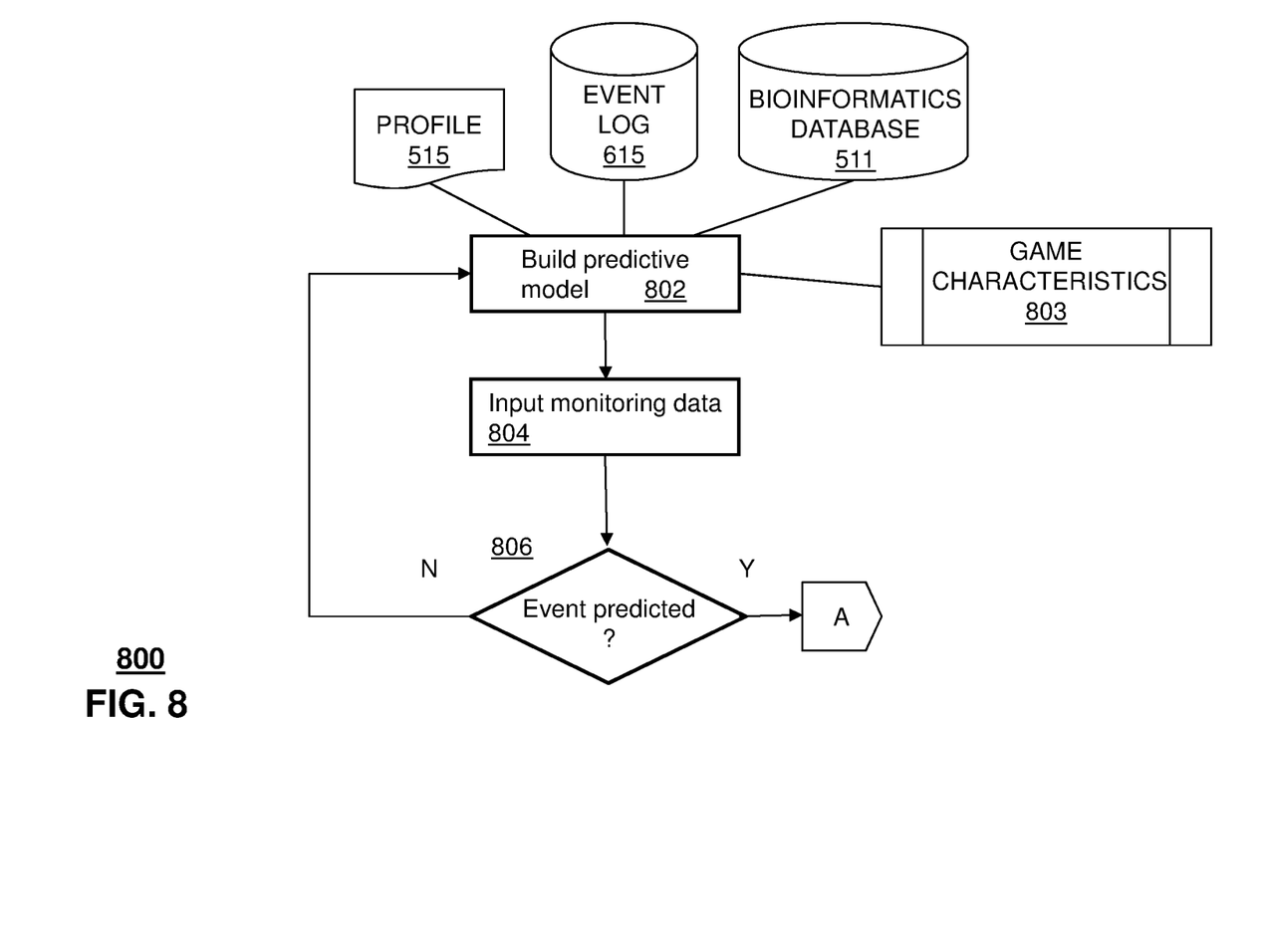
FIG. 8 is a flowchart showing steps in a method for constructing and implementing a predictive model for a gamer's response to game stimuli, in accordance with an embodiment of the disclosure.

Methods 500 and 600 discussed above relate to constructing a gamer's bioinformatics profile, and monitoring and correcting a gamer's performance in real time. In a further embodiment, the gaming engine can use the gamer's profile and other available data to predict events affecting the gamer's performance. FIG. 8 is a flowchart showing steps in a method 800 for predicting an event such as a gamer panic reaction.

In step 802, the gaming engine uses the gamer's profile 515, bioinformatics database 511, the characteristics 803 of the particular game, and the log 615 of the gamer's previous events in playing that game to build a predictive model for the gamer's interaction with the game. For example, a linear regression model can be used to predict a panic attack or loss of control by the gamer, based on the gamer's previous experience at certain points of a game. Characteristics of games can be compared with each other and with the gamer's profile to predict a gamer's reactions in a game he has not previously played. For instance, an unplayed game can be characterized as a high-speed, first-person shooter game. Monitored user data from other high-speed, first-person shooter games that have been played by the user can be utilized for predicting the gamer's reactions.

In step 804, biometric data and HW stats are collected in real-time during a game, as described above in method 600. This data is used to update the predictive model. If the model predicts an event (step 806), the gaming engine can invoke a corrective action before the real-time data signals an actual event. This can be especially useful to a gamer who is not experienced at the game being played.

The foregoing embodiments are a subset of possible embodiments contemplated by the present disclosure. Other suitable modifications can be applied to the present disclosure. As an example, images can be captured (e.g., via an image sensor device) and analyzed to generate facial objects for the gamer which can in turn be compared to baseline (unstressed) facial object images of the gamer. The comparison can be used to detect whether a gamer is experiencing stress from the game based on changes to facial expressions. This technique can be applied to multiple gamers in a single setting (e.g., multiple gamers using a single gaming console) by identifying separate facial objects for each of the gamers, such as through use of image pattern recognition and user profiles for each of the gamers.

In one or more embodiments, combinations of biometric information can be utilized to detect and verify a crisis situation for which corrective action can be applied. For example, a gamer's pulse rate can be monitored to identify a potential crisis event and then the crisis event can be verified through analysis of second biometric data, such as body temperature, eye movement or facial expression changes.

In one or more embodiments, biometric data can be evaluated to identify the best or better predictor of a crisis event, such as identifying a more noticeable change in pulse rate and eye movement when a crisis event is imminent. In this example, it may also be detected that other biometric data is less susceptible to change when the crisis event is imminent, such as detecting only a slight change in body temperature or facial expressions. Continuing with this example, an evaluation of the biometric data can be performed to determine that of the group of biometric data (pulse rate, eye movement, body temperature and facial expressions) only the pulse rate or eye movement will be monitored to predict or otherwise detect a crisis event. In one embodiment, this evaluation can be based on data change thresholds, such as only monitoring biometric data which has previously shown a change of X percent when a crisis event is imminent.

Figure 9:
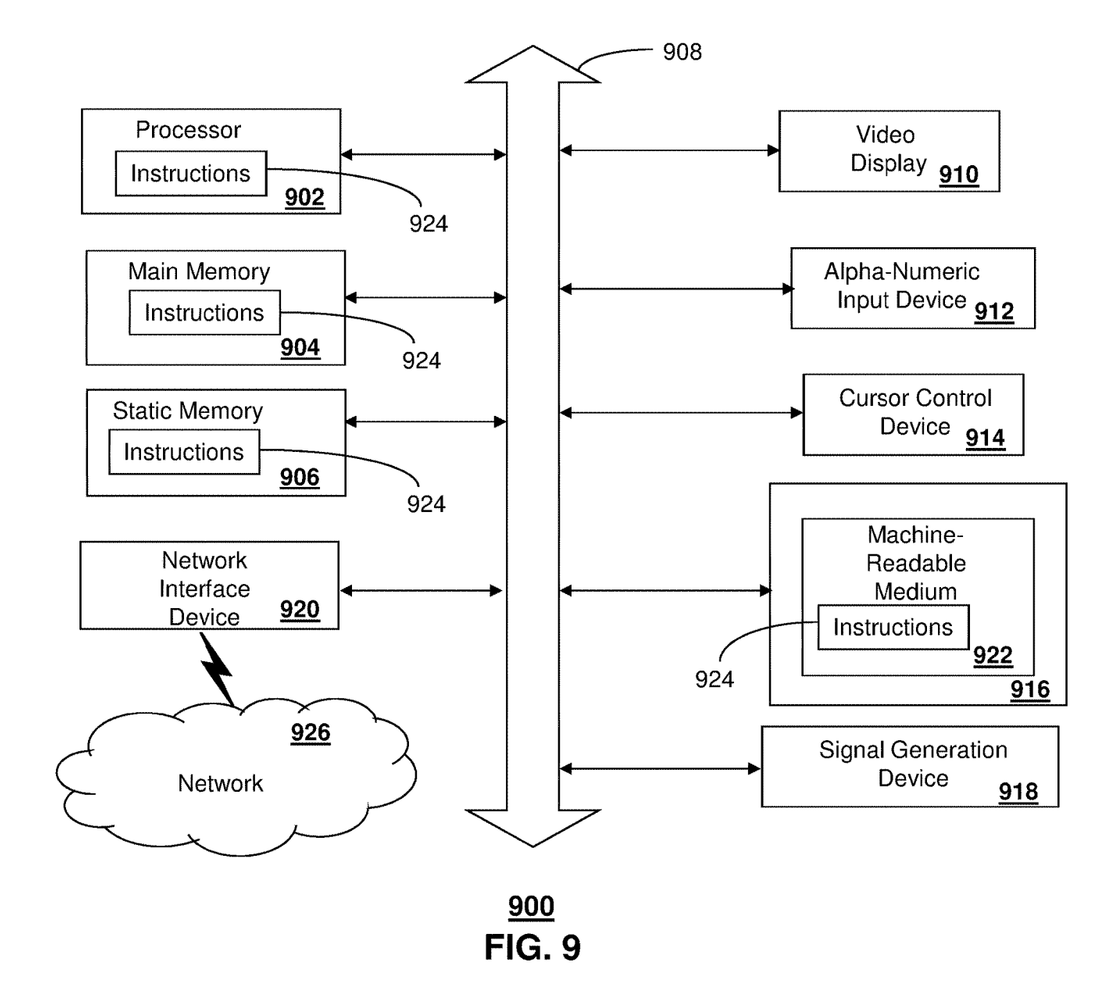
FIG. 9 depicts an illustrative diagrammatic representation of a machine in the form of a computer system within which a set of instructions, when executed, may cause the machine to perform any one or more of the methodologies disclosed herein.

FIG. 9 depicts an exemplary diagrammatic representation of a machine in the form of a computer system 900 within which a set of instructions, when executed, may cause the machine to perform any one or more of the methods discussed above. One or more instances of the machine can operate as any of devices depicted in FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, ZigBee), and long-range communications (e.g., WiMAX, GSM, CDMA, LTE) are contemplated for use by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    determining, by a processing system comprising a processor, whether data generated by a biometric sensor indicates that a game performance event has occurred that requires invocation of a corrective action during a game session, wherein the data is indicative of physiological stress responses of a game user to stimuli of a game situation during the game session;
    applying, by the processing system, a predictive model to the data to predict an occurrence during the game session of a future game performance event; and
    invoking, by the processing system, the corrective action in accordance with the occurrence of the future game performance event.

2. The method of claim 1, further comprising:
    establishing, by the processing system, a profile for the game user;
    providing, by the processing system, access to the profile via a network;
    establishing, by the processing system, a gamer profile for a specific game;
    analyzing, by the processing system, profiles of gamers accessed via the network; and
    identifying, by the processing system, a candidate gamer in accordance with comparing a profile of the candidate gamer with the gamer profile.

3. The method of claim 2, further comprising sending, by the processing system, a candidate gamer message to the candidate gamer.

4. The method of claim 1, wherein the biometric sensor is integrated with a game accessory, and wherein the data comprises one or more of pulse rate, temperature, perspiration, eye movement, speech pattern, or facial expression of the game user.

5. The method of claim 1, wherein the corrective action comprises changing presentation of the game session to the game user or transferring gaming control from the game user.

6. The method of claim 1, wherein the corrective action comprises providing a visual coaching message or an audio coaching message to the game user.

7. The method of claim 1, wherein the stimuli comprise a plurality of audiovisual stimuli and wherein the corrective action comprises continuing presentation of the game situation with a reduced rate of audiovisual stimuli to the game user.

8. A gaming device, comprising:
    a biometric sensor;
    a memory that stores instructions; and
    a processor coupled to the memory, wherein responsive to executing the instructions, the processor performs operations comprising:
        obtaining biometric data generated by the biometric sensor, wherein the biometric data represents physiological stress responses of a game user to audiovisual stimuli of a game situation during a game session;
        determining whether the biometric data indicates an occurrence during the game session of a game performance event requiring initiation of a corrective action;
        predicting, by applying a predictive model to the biometric data, an occurrence during the game session of a future game performance event; and
        initiating the corrective action in accordance with the occurrence of the future game performance event.

9. The gaming device of claim 8, wherein the operations further comprise establishing a profile for the game user based on game performance criteria.

10. The gaming device of claim 9, wherein the operations further comprise updating an event log in accordance with the occurrence of the game performance event, wherein the predictive model is generated in accordance with the profile, the event log, and game characteristics.

11. The gaming device of claim 9, wherein the operations further comprise:
    providing access to the profile via a network;
    establishing a gamer profile for a specific game;
    analyzing profiles of gamers accessed via the network;
    identifying a candidate gamer in accordance with comparing a profile of the candidate gamer with the gamer profile; and
    sending a message to the candidate gamer.

12. The gaming device of claim 8, wherein the corrective action comprises continuing presentation of the game situation with a reduced rate of audiovisual stimuli to the game user.

13. A non-transitory computer-readable storage device, comprising instructions that, when executed by a processor, cause the processor to perform operations comprising:
    determining whether biometric data generated by a biometric sensor indicates an occurrence of a game performance event requiring initiation of a corrective action during a game session, wherein the biometric data represents physiological stress responses of a game user to audiovisual stimuli of a game situation during the game session;

building a predictive model for predicting occurrences of the game performance event;

predicting an occurrence during the game session of a future game performance event by applying the predictive model to the biometric data; and initiating the corrective action in accordance with the occurrence of the future game performance event.

14. The non-transitory computer-readable storage device of claim 13, wherein the operations further comprise:

receiving game performance data of the game user, and subsequently determining, based on game performance criteria, whether the game performance data indicates the occurrence of the game performance event.

15. The non-transitory computer-readable storage device of claim 14, wherein the game performance data comprises at least one of a click rate, firing rate, firing accuracy or movement accuracy of the game user.

16. The non-transitory computer-readable storage device of claim 14, wherein the operations further comprise:

establishing a profile for the game user based on the game performance criteria;

providing access to the profile via a network;

establishing a gamer profile for a specific game;

analyzing profiles of gamers accessed via the network;

identifying a candidate gamer in accordance with comparing a profile of the candidate gamer with the gamer profile; and sending a message to the candidate gamer.

17. The non-transitory computer-readable storage device of claim 13, wherein the corrective action comprises continuing presentation of the game situation with a reduced rate of audiovisual stimuli to the game user.

18. The non-transitory computer-readable storage device of claim 13, wherein the corrective action comprises providing a visual coaching message or an audio coaching message to the game user.

19. The non-transitory computer-readable storage device of claim 13, wherein the corrective action comprises transferring gaming control from the game user.

20. The non-transitory computer-readable storage device of claim 13, wherein the biometric sensor is integrated with a game accessory, and wherein the biometric data comprises at least one of pulse rate, temperature, perspiration, eye movement, speech pattern, or facial expression of the game user.

\* \* \* \* \*